Feb. 20, 1923.
F. J. HEALEY.
VARIABLE VELOCITY RATIO GEARING.
FILED JUNE 29, 1920.
1,446,294.
2 SHEETS—SHEET 1.
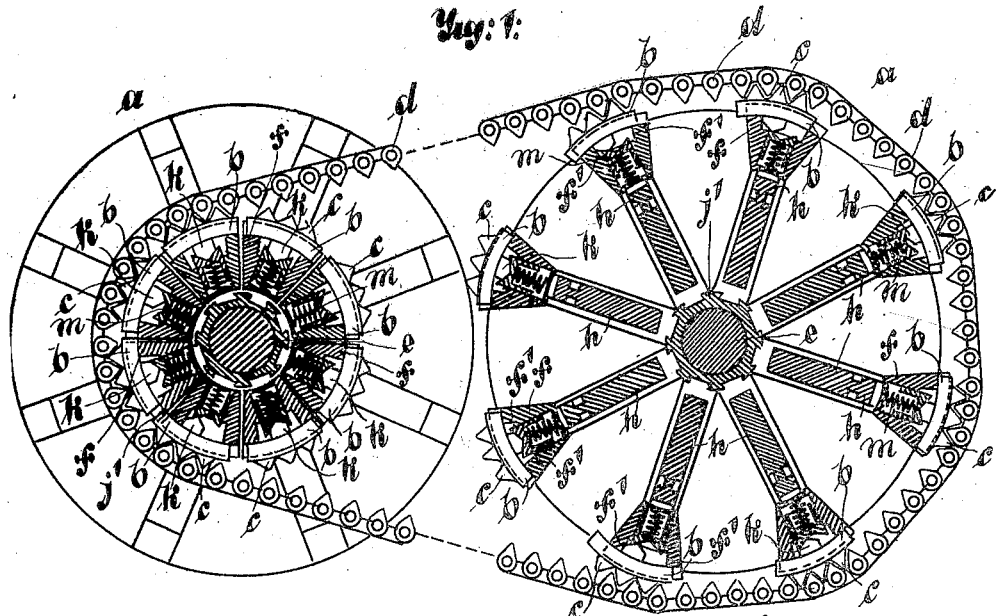
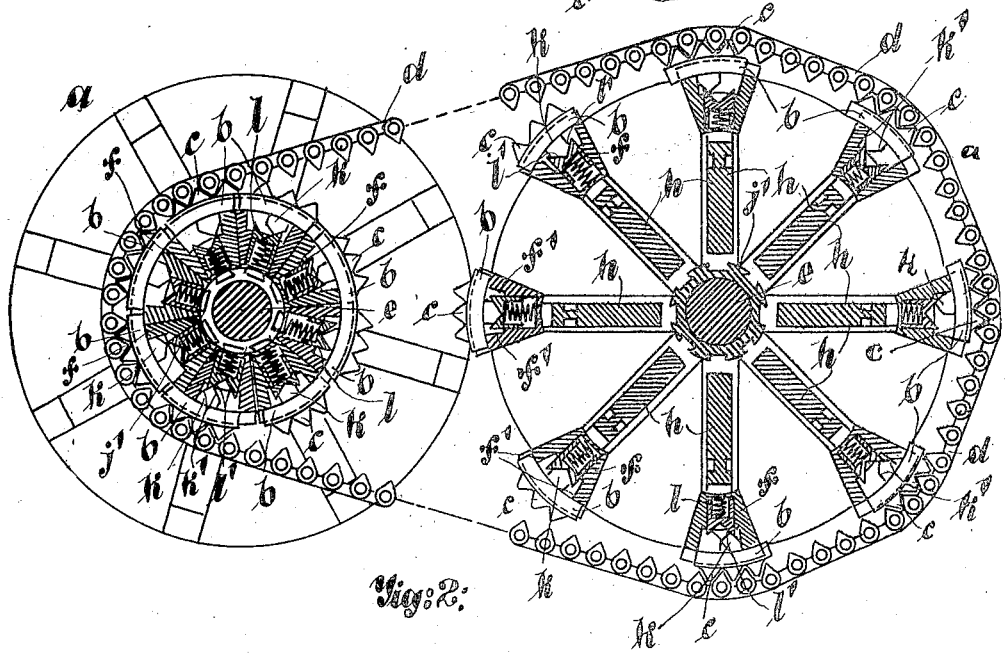
INVENTOR
Francis J. Healey
By Wm Wallace White
ATTY.

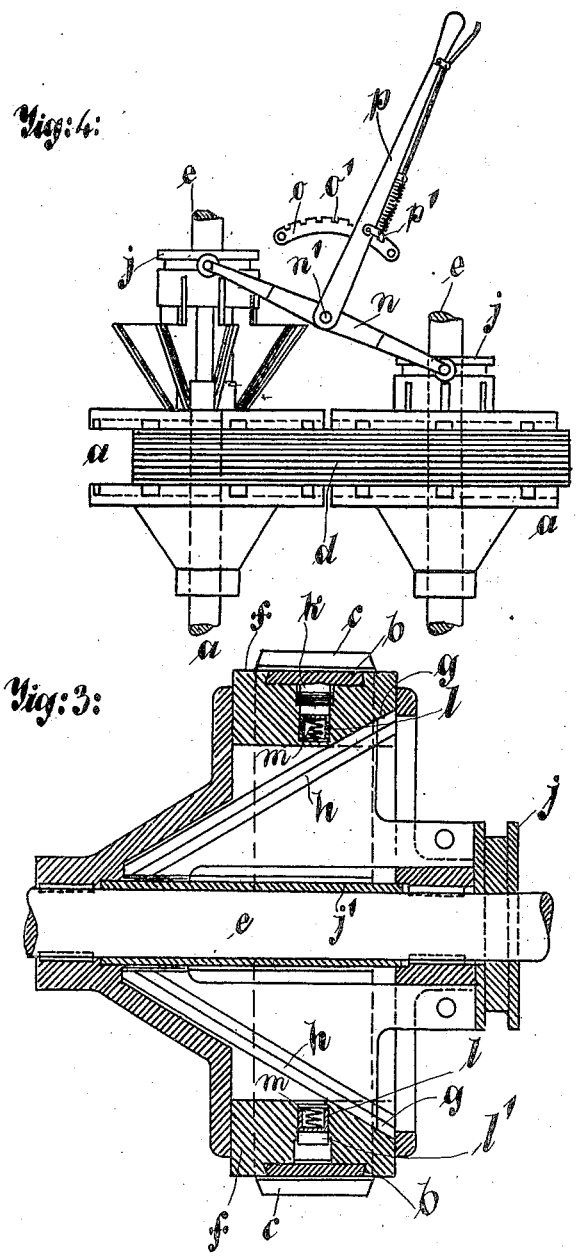

Patented Feb. 20, 1923.

1,446,294

UNITED STATES PATENT OFFICE.

FRANCIS JEREMIAH HEALEY, OF LONDON, ENGLAND, ASSIGNOR TO THE HEALEY SYNDICATE LIMITED, OF LONDON, ENGLAND, A BRITISH LIMITED LIABILITY COMPANY.

VARIABLE VELOCITY RATIO GEARING.

Application filed June 29, 1920. Serial No. 392,778.

*To all whom it may concern:*

Be it known that I, FRANCIS JEREMIAH HEALEY, a subject of the King of Great Britain and Ireland, residing at 33 Poultry, in the city of London, England, have invented new and useful Improvements in and Relating to Variable Velocity Ratio Gearing, of which the following is a specification.

This invention relates to velocity ratio gearing particularly applicable to motor cars, aeroplanes, stationary machinery of all kinds and the like, has particular reference to gearing involving a single chain and has for its object the provision of means whereby low weight, small initial cost, high efficiency, and great robustness of construction are obtained in this class of gear.

The invention consists in the arrangement of an expansible and contractible driving sprocket in association with an expansible and contractible driven sprocket both sprockets being disposed in one plane and upon parallel shafts, said sprockets being adapted to be operatively engaged by an endless chain of predetermined and constant length, means adapted to simultaneously expand and contract the driving and driven sprockets respectively and vice versa, means adapted to enable the individual tooth or a series of two or more teeth to be temporarily displaced relative to their driving position during the expanding or contracting operation while said teeth are in engagement with the chain, means adapted to return said individual teeth or series of teeth to a predetermined position upon disengagement from the chain, means associated with the teeth or series of teeth adapted to transmit power from the chain to the shaft of the sprocket and vice versa and means adapted to maintain both sprockets at definite predetermined diameters.

In order that the invention may be the better understood I will now proceed to describe the same in relation to the accompanying drawings, reference being had to the letters and figures marked thereon.

Like letters refer to like parts in the various figures in which:—

Fig. 1. shows the parts displaced during the diameter changing operation.

Fig. 2. shows the parts in the driving position.

Fig. 3 is an end cross sectional elevation of one of the sprockets illustrated in Fig. 1, and Fig. 4 illustrate diagrammatically a system of operating gear suitable for use with the arrangements indicated in the preceding figures.

In the drawings which illustrate by way of example how the invention may be carried into effect the rim of each sprocket $a$ is divided up into eight segments $b$, all of which are provided with teeth $c$ of such form as may be suitable to engage with the chain $d$. Each segment $b$ has its movement so constrained as to maintain the teeth $c$ thereon normal to the axis of the shaft $e$ and is carried on and supported by a block $f$ which is provided with an angularly disposed keyway $g$ of T-cross section. All the keyways $g$ are engaged by angularly disposed keys $h$ of T-section attached to or formed integrally with the bush $j'$ of the expanding and contracting device $j$.

To enable expansion or contraction of such a sprocket $a$ the teeth $c$ of which are engaged by a chain $d$ to be effected, each toothed segment $b$ is slidingly mounted on its associated block $f$ in such manner that its possible displacement is limited to movement of a circumferential character relative to the sprocket $a$ as a whole, within predetermined limits, and under spring or other elastic or yielding control which is effected in the following manner: Each toothed segment $b$ on the surface remote from that carrying the teeth $c$ is provided with a projection $k$ having inclined sides $k'$ which engage with the inclined sides $l'$ of the plunger $l$. The plunger $l$ is recessed to receive a spring $m$ which acting against the block $f$ as an abutment tends to force the plunger $l$ away from the centre of the sprocket *a* and maintain the segments *b* in position by the interaction of the inclined sides *k' l'*. The normal driving position of any segment *b* is when the projection *k* formed on or attached to it is in contact with one of the surfaces *f' f'* of the block *f* associated therewith.

Upon movement of the expanding and contracting device *j* along the longitudinal axis of the shaft *e* the angularly disposed keys *h* engaging with their respective keyways *g* cause the blocks *f* and segments *b* associated therewith to move radially and normally to the axis of the shaft *e*.

In the foregoing description only one sprocket *a* and expanding and contracting device *j* has been described but it is obvious that two such sprockets and attendant devices must be associated together and disposed in proper relation one to the other as for example the arrangement illustrated in Fig. 4.

In this arrangement the operating means include a lever *n* which is pivoted at *n'* between the shafts *e e* so that upon movement of the said lever *n* the expanding and contracting devices *j j* associated with each sprocket *a* operates in opposite manner and expands one sprocket *a'* while contracting the other.

It is obvious that the effective pitch circumference of the sprockets *a a* when driving must be an integral number of pitch distances and in order to enable the positions of the expanding and contracting devices *j j* to be easily adjusted so as to obtain this relation a notched segment *o* may be disposed in proximity to the operating lever *p* associated with the lever *n* and provided with a latch *p'* to engage the notches *o'* in the segment *o*.

In use when the diameters of the sprockets *a a* are so selected that the circumferences are substantially equal to an integral number of pitch lengths all the segments *b* engaged by the chain *d* are displaced until the projections *k* contact with one of the surfaces *f' f'* of the recesses formed in the blocks *f* and it will be in this position that the normal drive is effected. When it is desired to vary the velocity ratio of the shafts *e e* the lever *p* is moved along the notched segment *o* until the latch *p'* engages with the desired notch *o'*; this movement of the lever *p* will through the intermediation of the lever *n* vary the positions of the devices *j j* thus expanding one sprocket *a* and contracting the other.

Obviously during the change from one pitch diameter to another the pitch circumference will not comply with the requirements that it shall involve an integral number of pitch lengths and in order to enable the chain *d* to properly mesh with the engaged teeth *c* all the segments *b* (except one) carrying such teeth are temporarily displaced from their normal driving positions the unaffected segment *b* instantaneously transmitting the whole load as shown in Fig. 1. As the sprocket *a* rotates this segment *b* is disengaged from the chain *d* and assumes its free position, the load being transferred to the next segment *b* following which in turn is released the sequence of operations being continued until a pitch circumference having an integral number of pitch lengths is obtained.

It will readily be seen that by this arrangement for the addition to and subtraction from the number of teeth *c* simultaneously engaged by the chain *d* any variation of the diameter of the sprocket *a* within practical limits can be effected and that the number of segments *b* employed, the number of teeth *c* on each segment or their elimination altogether from some segments when desired, the type of yielding resistance described and the construction and details of the operating gear can all be modified or varied to suit any particular desired application without departure from the spirit of the invention.

It is also obvious that a friction clutch or the like may be provided between the source of power and the driving sprocket if so desired and said friction clutch or the like may be adapted to be operated as and when necessary by the operating lever.

I claim:—

1. A variable velocity ratio gearing comprising an expansible and contractible driving sprocket, an expansible and contractible driven sprocket, an endless chain of predetermined and constant length, means adapted to simultaneously expand and contract the driving and driven sprockets respectively and vice versa, means adapted to enable an individual tooth or a series of teeth to be temporarily circumferentially displaced relative to their normal driving position by the chain during the expanding and contracting operation, means adapted to return said individual tooth or series of teeth to a predetermined position located intermediate of the ends of the possible travel upon disengagement from the chain, means associated with the teeth or series of teeth adapted to transmit power from the chain to the shaft of the sprocket and vice versa and means adapted to maintain both the driving and driven sprockets at definite predetermined diameters, substantially as described.

2. In a variable velocity ratio gearing as claimed in claim 1, movable segments carrying the sprockets, blocks having keyways therein for supporting said segments, spring-urged devices carried by said blocks and having inclined planes adapted to engage the inclined planes on the segments, means for limiting the movement of the segments relative to the blocks, a plurality of inclined keys adapted to engage said blocks and control the movement thereof radially of the sprocket axis, means adapted to define the radial movement of said blocks, and a bushing adapted to support and simultaneously move all the inclined keys a similar amount, substantially as described.

In witness whereof I have signed my name to this specification in the presence of two subscribing witnesses:—

FRANCIS JEREMIAH HEALEY.

Witnesses:
 DORIS HITCHCOCK,
 OLIVE WEST.